US011391863B2

(12) United States Patent
Chen et al.

(10) Patent No.: US 11,391,863 B2
(45) Date of Patent: Jul. 19, 2022

(54) METHOD OF FREE-FIELD BROADBAND CALIBRATION OF HYDROPHONE SENSITIVITY BASED ON PINK NOISE

(71) Applicant: Zhejiang University, Hangzhou (CN)

(72) Inventors: Yi Chen, Hangzhou (CN); Guanghui Jia, Hangzhou (CN); Xiaofeng Jin, Hangzhou (CN); Liuqing Yang, Hangzhou (CN); Han Zhao, Hangzhou (CN)

(*) Notice: Subject to any disclaimer, the term of this patent is extended or adjusted under 35 U.S.C. 154(b) by 267 days.

(21) Appl. No.: 16/861,225

(22) Filed: Apr. 29, 2020

(65) Prior Publication Data
US 2020/0355843 A1    Nov. 12, 2020

(51) Int. Cl.
G01V 13/00 (2006.01)
G01V 1/38 (2006.01)
G01V 1/18 (2006.01)
G01V 1/24 (2006.01)
G01S 7/52 (2006.01)

(52) U.S. Cl.
CPC .......... *G01V 13/00* (2013.01); *G01S 7/52004* (2013.01); *G01S 7/5205* (2013.01); *G01V 1/186* (2013.01); *G01V 1/245* (2013.01); *G01V 1/38* (2013.01); *G01V 2210/324* (2013.01)

(58) Field of Classification Search
CPC ........ G01V 13/00; G01V 1/186; G01V 1/245; G01V 1/38; G01S 7/52004; G01S 7/5205
See application file for complete search history.

(56) References Cited

U.S. PATENT DOCUMENTS 9,835,764 B2 * 12/2017 Crocker ................. G01V 13/00

FOREIGN PATENT DOCUMENTS

GB          2256273 A  * 12/1992  ............. G01H 3/005

OTHER PUBLICATIONS

Cui et al., "Underwater Calibration of Hydrophones at Very Low Frequencies from 30 Hz to 2 KHz", XXII World Congress of International Measurement Confederation (IMEKO 2018), IOP Conf. Series: Journal of Physics: Conf. Series 1065, doi:10.1088/1742-6596/1065/7/072015 (Year: 2018).*

* cited by examiner

*Primary Examiner* — Ian J Lobo

(57) ABSTRACT

A method of free-field broadband calibration of hydrophone sensitivity based on pink noise, relating to the field of free-field underwater acoustic measurement, and is mainly used for broadband measurements of hydrophone sensitivity in free-field. The method of the present disclosure is to transmit a broadband pink noise signal by controlling the signal source, and to perform the synchronous processing and FFT to the transmitted current signal and the received voltage signal, such as interception and zero padding, and finally obtain the transfer function in the frequency domain; by analyzing the direct wave and the reflected wave in the water tank, the transfer function is averaged by a rectangular window to eliminate the influence of the reverberation of the reflected wave in the water tank, so as to obtain the broadband transfer function of the free-field between the transmitting transducer and the hydrophone.

7 Claims, 2 Drawing Sheets

METHOD OF FREE-FIELD BROADBAND CALIBRATION OF HYDROPHONE SENSITIVITY BASED ON PINK NOISE

CROSS-REFERENCE TO RELATED APPLICATIONS

This application claims priority to Chinese Application No. 201910380585.7, filed on May 8, 2019, entitled "METHOD OF FREE-FIELD BROADBAND CALIBRATION OF HYDROPHONE SENSITIVITY BASED ON PINK NOISE", which is hereby incorporated by reference.

TECHNICAL FIELD

The present disclosure relates to the technical field of underwater acoustic measurement, and particularly relates to a method of free-field broadband calibration of hydrophone sensitivity based on pink noise.

BACKGROUND

With the development of underwater acoustic technology, underwater acoustic measurement plays an important role in ensuring the performance and normal use of underwater acoustic equipment. Free field is the sound field that is closest to the actual working environment of underwater acoustic equipment such as transducers and hydrophones. Therefore, the research of free field calibration plays an important role in ensuring the development and practical application of underwater acoustic transducers and hydrophones.

For a long time, pulsed sound technology has been the most commonly used technical method in underwater electroacoustic parameter measurement. This method can separate the direct signal and the reflected signal in time by transmitting a single-frequency pulse signal with a finite period to reduce the influence of the pool boundary reflection on the measurement. However, this method still has certain limitations: (1) the pulsed sound technology mainly emits a short period of sine filling short pulse signal by a certain period, using the time delay of direct sound and reflected sound to reach the separation of direct wave and reflected waves in the time domain, but as the measurement frequency decreases, the wavelength of the sound wave becomes longer, making the pulse wave with a certain period last longer in the time domain, and the reflected sound will be superimposed on the direct sound, resulting in inability to separate the direct wave and the reflected wave in the time domain; (2) with the decrease of the measurement frequency, the sound absorption effect of the acoustic wedges of the anechoic tank on the sound wave becomes worse, and the reflection wave of the anechoic tank has a greater impact on the measurement; (3) pulsed sound technology can usually only complete single-frequency measurement, while underwater acoustic equipment such as transducer and hydrophone usually works in noise signals or continued signals in actual measurement, requiring that its broadband frequency response, thus, the current technology cannot meet the broadband measurements of transducer and hydrophone.

In order to make up for the deficiency of the current transducer and hydrophone measurement methods, various signal processing technologies have been studied, including: sound pulse transient restraining technology, broadband measurement technology, Prony spectrum analysis technology, multi-path signal modeling technology, spatial domain multiple averaging technology and mixed field test technology. These methods use system reconstruction, establishment of water tank space model, signal processing and other methods to improve the original sound pulse technology to reduce the lower measurement limit of limited water area in a certain length, thereby enhancing the efficiency of underwater acoustic measurement.

At present, with the measurement of free-field underwater acoustic transducers and hydrophones gradually developing towards low-frequency, high-power and broadband measurement, the low-frequency broadband measurement of free-field transducers and hydrophones in limited size of water area has become an important development direction of underwater acoustic measurement. Meanwhile, with the continuous development of noise measurement technologies such as underwater environmental noise measurement, underwater moving target noise measurement, and offshore piling noise measurement, the broadband frequency response of transducers and hydrophones in noisy environments has also become an important research field of the underwater acoustic measurement.

SUMMARY

In view of the above, the present disclosure provides a pink noise-based hydrophone sensitivity free-field broadband calibration method. The device can realize low-frequency broadband measurement of the hydrophone in free-field under noisy conditions, making up for the deficiency of the common single-frequency pulse measurement methods in currently used.

A method of free-field broadband calibration of hydrophone sensitivity based on pink noise including the following steps:

(1) generating a pink noise signal with a certain bandwidth according to a measurement frequency range, and performing a power amplification on the pink noise signal;

(2) exciting, by the pink noise signal after power amplification, a transmitting transducer to generate an sound signal underwater, receiving the sound signal by two hydrophones, wherein one of the two hydrophones is a standard hydrophone, whose sensitivity $M_0$ is known, and the other one is the hydrophone under test, the sensitivity Mr of the hydrophone under test is to be tested; converting the received sound signal into a corresponding voltage signal by the two hydrophones, respectively, performing impedance matching and pre-amplification on the corresponding voltage signal by a preamplifier, then performing anti-aliasing filtering on the corresponding voltage signal after amplification by a filter to obtain the open circuit voltage signal $U_0$ corresponding to the standard hydrophone and the open circuit voltage signal $U_x$ corresponding to the hydrophone under test;

(3) at the same time, performing current sampling on the pink noise signal after power amplification to generate a corresponding voltage signal $U_I$ at a ratio of 1:1, inputting the voltage signal $U_I$ to the preamplifier to conduct impedance matching and pre-amplification, and performing anti-aliasing filtering by a filter;

(4) storing the voltage signals $U_0$ and $U_x$ and the voltage signal $U_I$ obtained after current sampling in the computer;

(5) after repeating n times according to steps (1) to (4), obtaining n groups of open circuit voltage signals $U_{01}$, $U_{02}$, ..., $U_{0n}$ of the standard hydrophone, n groups of open circuit voltage signals $U_{x1}$, $U_{x2}$, ..., $U_{xn}$ of the hydrophone to be tested and n groups of voltage signals $U_{I1}$, $U_{I2}$, ..., $U_{In}$ after current-transformed; performing time delay processing to these signals respectively in the computer to obtain following voltage signals accordingly: ($U'_{01}$, $U'_{02}$, ..., $U'_{0n}$, $U'_{x1}$, $U'_{x2}$, ..., $U'_{xn}$ and $U'_{I1}$, $U'_{I2}$, ..., $U'_{In}$; and then performing FFT (Fast Fourier Transform) calculation on these obtained signals to obtain the corresponding complex spectrum $F_{01}$, $F_{02}$, ..., $F_{0n}$, $F_{x1}$, $F_{x2}$, ..., $F_{xn}$ and $F_{I1}$, $F_{I2}$, ..., $F_{In}$; wherein n is a natural number and is greater than 1;

(6) averagely calculating the above complex spectrum in a frequency domain according to equation (1) to obtain the signals $F_0$, $F_x$ and $F_I$ after averaging the corresponding complex spectrum; thereby obtaining a complex response function of the transfer impedance between the standard hydrophone and the transmitting transducer and the hydrophone under test with respect to the frequency f through the voltage signals, wherein the complex response function comprises random noise and reflected sound, as shown in equation (2):

$$F_0 = \frac{F_{01} + F_{02} + ... + F_{0n}}{n} \quad (1)$$

$$F_x = \frac{F_{x1} + F_{x2} + ... + F_{xn}}{n}$$

$$F_I = \frac{F_{I1} + F_{I2} + ... + F_{In}}{n}$$

$$Z_x(f) = F_x / F_I \quad (2)$$

$$Z_0(f) = F_0 / F_I$$

wherein $Z_x(f)$ is the complex response function of the transfer impedance between the transmitting transducer and the hydrophone under test with respect to the frequency f, $Z_0(f)$ is the complex response function of the transfer impedance between the transmitting transducer and the standard hydrophone with respect to frequency f;

(7) performing complex moving average processing on the complex response function using a rectangular window in the frequency domain to obtain the complex transfer impedance between the transmitting transducer and the hydrophone under free-field conditions;

For the specific technical realization of this step, please refer to the Chinese patent No. CN104199013A.

(8) under the premise that the sensitivity of the standard hydrophone is known, calculating the broadband sensitivity of the hydrophone under test according to the transfer impedance of the two hydrophones and the transmitting transducer under free-field conditions, as shown in equation (3):

$$M_x(f) = 20 lg \frac{Z_x(f) d_x}{Z_0(f) d_0} + M_0(f) \quad (3)$$

wherein $M_x(f)$ is the broadband sensitivity of the hydrophone under test at frequency f, $M_0(f)$ is the broadband sensitivity of the standard hydrophone at frequency f, and $d_x$ is the distance between the transmitting transducer and the hydrophone under test, $d_0$ is the distance between the transmitting transducer and the standard hydrophone.

Further, the specific implementation process of the step (1) is: firstly, generating pink noise data by a PXI controller or a computer; then generating the pink noise signal according to the pink noise data from the signal source; finally, performing the power amplification to the pink noise signal by a power amplifier, and exciting the transmitting transducer to generate an sound signal underwater.

In some embodiments, a width of the rectangular window in step (7) depends on a spatial size of the free-field in the limited water area and time delay of the reflected wave and the direct wave, the time delay $t_d$ of the reflected wave and the direct wave is measured by transmitting a high-frequency pulse signal, and then the width $\Delta f_W$ of the moving average rectangular window is obtained, which meets the following conditions:

$$(0.8/t_d) \times \Delta f \leq \Delta f_W \leq (1/t_d) \times \Delta f \quad (4)$$

wherein $\Delta f$ is the frequency resolution of the corresponding voltage signal after FFT, $\Delta f = f_s/N$, $f_s$ is the sampling rate, N is the number of sampling points of the noise signal, and $t_d$ is the time delay of the reflected wave and direct wave.

In some embodiments, the power of the pink noise signal is continuously attenuated from low frequency to high-frequency with frequency f, that is, the power spectral density of the signal=1/f; the pink noise signal is a broadband signal, and the bandwidth of the pink noise signal is greater than the measurement frequency bandwidth, and the upper limit and lower limit of the bandwidths meet the following relationship:

$$f_l \leq f_{l0} - \frac{\Delta f_W}{2} \quad (5)$$

$$f_h \leq f_{h0} + \frac{\Delta f_W}{2}$$

wherein $f_l$ is the lower limit frequency of the pink noise signal, $f_{l0}$ is the lowest frequency of the measurement frequency band, $f_h$ is the upper limit frequency of the pink noise signal, $f_{h0}$ is the maximum frequency of the measurement frequency band, and $\Delta f_W$ is the width of the moving average rectangular window in the frequency domain.

In some embodiments, the time delay processing in the step (5) is: firstly, measuring the time delay, trigger delay of the sound signal sent by the transmitting transducer and the time delay caused by the difference in acoustic path between the transmitting transducer and the hydrophone under test by the high-frequency pulse signal; performing interception and zero padding on the sound signal by the corresponding number of sampling points to ensure that the transmitted signal and the received signal have the same signal length and one-to-one corresponds to each other in time.

The noise signal used in the method of the present disclosure is a pink noise signal, which is a signal whose energy decays with frequency and satisfies the 1/f relationship, while the frequency response curve of the transmitting transducer away from the resonance point is an increasing curve with the frequency, so the actual transfer impedance will be a flat frequency response curve, which can improve the accuracy of moving average processing.

The entire measurement process of the method of the present disclosure is carried out in waters, not limited to an anechoic tank, a reverberation tank and lakes, seas and other water areas, the shape of the water area is not limited to a rectangular or a tank.

When the rectangular window is used for complex moving weighted averaging (CMWA) method of the present disclosure, a moving average rectangular window needs to be selected according to the boundary reflection of the measured water area to restrain the fluctuation effect of the reflected wave on the transfer function, and the processing times depends on the reverberation of the water area; when the boundary reflection is strong, the processing times are many; when the boundary reflection is week, the processing times are less; the size of the moving average window depends on the delay time of the reflected wave.

The method of the present disclosure is to transmit a broadband pink noise signal by controlling the signal source, and to perform interception, zero padding and FFT to the transmitted current signal and the received voltage signal to obtain the transfer function in the frequency domain; by analyzing the reflected wave in the water tank, the transfer function is conducted complex moving weighted averaging with a rectangular window to eliminate the influence of the reverberation of the reflected wave in the water tank, so as to realize the broadband measurement of hydrophone sensitivity. This method allows broadband calibration of hydrophones in anechoic water tank, reverberant water tank and outfield lakes, and in the sea.

DETAILED DESCRIPTION OF THE DISCLOSURE

Figure 1:
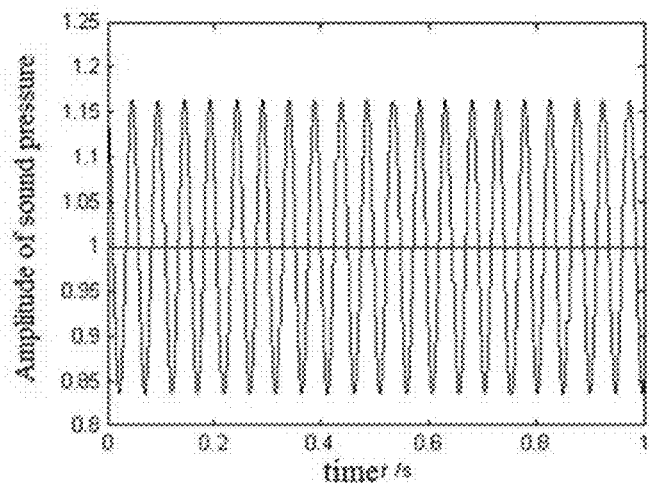
FIG. 1 is the normalized curve diagram showing the waves under the action of direct sound only and under the joint action of the direct sound combined with reflected wave.

In order to describe the present disclosure more specifically, the technical solution of the present disclosure will be described in detail below with reference to the drawings and specific embodiments.

The method of free-field broadband calibration of hydrophone sensitivity based on pink noise of the present disclosure has the following measurement device structure and requirements: (1) a signal source capable of transmitting broadband noise signal, wherein the signal source is capable of transmitting any programmable signal and has a flat frequency response within the measuring frequency band; (2) a linear power amplifier, wherein the power amplifier have linear characteristics within the broadband signal frequency range; (3) a transmitting transducer, the transmitting transducer is linear in the measurement frequency band, and has a wide bandwidth; (4) a preamplifier, wherein the preamplifier has high impedance and low noise, and has phase consistency in the measurement frequency range; (5) a filter, wherein the frequency range of the filter covers the measurement frequency range; (6) a data acquisition system, wherein the data acquisition system has two channels, and the sampling rate is more than 10 times of the highest frequency of the measured broadband signal, and the consistency of the two channels is not less than 1%; (7) a PXI controller (or computer) is used to generate pink noise signal data and carry out subsequent signal processing and analysis.

The method of free-field broadband calibration of hydrophone sensitivity based on pink noise including the following steps:

(1) The current noise signal $U_I$ transmitted by the transmitting transducer and the voltage noise signals $U_0$ and $U_x$ received by the hydrophone need to meet a one-to-one correspondence in the time domain. However, in the actual measurement process, due to the acoustic path difference between the transmitting transducer and the hydrophone, the two sets of signals also have time delay in the time domain. Thus, the two sets of signals need to be carried out interception processing before FFT (Fast Fourier Transform) analysis. Therefore, in order to ensure the corresponding relationship between the two groups of measured signals, the PXI controller (or computer) is required to control the signal source to transmit the electrical signal. The electrical signal is excited by the power amplifier to generate the high-frequency pulse signal. The high-frequency pulse signal is used to measure the time delay to of the transmitted electrical current signal and the trigger time delay $t_1$ of the acquisition system and the time delay t: caused by the acoustic path difference between the transmitting transducer and the hydrophone under test.

(2) The delay time $\Delta t_d$ of direct wave and echo is measured by transmitting high-frequency single frequency pulse signal. According to the uncertainty principle, the window width of the moving average corresponding to the time domain of the delay time should meet $\Delta f_W \times \Delta t_d \leq 1$. For different tanks, the delay time of the direct wave and the echo is different, and different rectangular windows are needed. Theoretically speaking, the smaller the bandwidth $\Delta f$ of the rectangular window is, the higher the resolution ratio of the moving average of the rectangular window is, and the closer the moving average is to the actual transfer impedance of the system transfer function. However, because the bandwidth $\Delta f$ is smaller, the average number of points inside the window is smaller, and the moving average effect becomes worse, which will lead to the larger deviation of the system. Therefore, it is usually taken as $0.8 \leq \Delta f \times \Delta t \leq 1$ through the test verification. At this time, the average effect is best.

(3) The computer controls the signal source to transmit the pink noise signal needed for measurement. The characteristic of pink noise is that its power (energy) continuously attenuates from low frequency to high-frequency, and the curve is 1/f, which usually shows that the energy decreases by 3 dB per octave. For the piezoelectric transducer, in the resonant frequency range far away from the transmitter, the equivalent impedance is almost pure capacitance type, and the transfer function of the system changes with the frequency, which is proportional to the frequency. Since pink noise is inversely proportional to the frequency change, the broadband response of its transfer function is approximately a relatively flat curve after the pink noise is transmitted through the transmitting transducer, which can improve the accuracy of moving average test.

The pink noise signal is a broadband signal, and the frequency bandwidth of the noise signal shall be greater than the measurement frequency bandwidth. The upper and lower limits of the noise signal bandwidth meet the following relationship:

$$f_l \leq f_{l0} - \frac{\Delta f_W}{2}$$
$$f_h \leq f_{h0} + \frac{\Delta f_W}{2}$$

(5)

(4) The transmitted current noise signal is outputted through the current and voltage sampler by a power amplifier, and the noise signal from the underwater is received by the hydrophone. The current noise signal and the voltage noise signal are input to the filter for low-pass filtering after the pre-amplification and impedance matching of the pre-amplifier. The significance of low-pass filtering is to eliminate the influence of the high-frequency noise signal and the aliasing after the data discretization on measurement.

(5) The data collector synchronously collects the transmitted current noise signal $U_I$ and the open circuit voltage noise signal $U_O$ and $U_x$ received by the hydrophone; because of the randomness of the broadband noise signal, in order to avoid the influence of the randomness of the noise signal on the measurement, it is necessary to collect the transmitted current noise signal and the open circuit voltage noise signal received by the hydrophone for many times, a total of n (n≥100) times.

(6) According to the current delay time $t_0$ measured in step (1), the trigger delay time $t_1$ of the data acquisition system, the measured delay time $t_2$ of the transmitting signal and the hydrophone acquisition signal, the n groups of signals are intercepted to obtain $U'_{01}, U'_{02}, \ldots, U'_{0n}, U'_{x1}, U'_{x2}, \ldots, U'_{xn}$ and $U'_{I1}, U'_{I2}, \ldots, U'_{In}$, to ensure that the signal has a one-to-one correspondence relationship.

(7) The received signals are performed FFT (fast Fourier transform), and n groups of the signals after FFT are averaged in the frequency domain to eliminate the influence of uneven frequency distribution on noise signals.

(8) The processed broadband noise signal is the response of the transmitted current and transmitted voltage with the change of frequency. However, due to the relatively long duration of transmitted noise signal, the transmitted current signal and transmitting voltage signal will be mixed with the reflection signal of limited water area boundary, so it is necessary to eliminate the reflection wave by complex moving weighted averaging (CMWA) method. Firstly, the frequency response function of the system transfer impedance under the condition of free field noise signal is obtained:

$$Z(f) = \frac{F_U(f)}{F_I(f)} = \frac{1}{r_0} S_I(f) H(f) M(f) \tag{6}$$

Wherein, Z(f) is the function of the transfer impedance of the system changing with the frequency under the condition of noise, $F_U(f)$ is the function of FFT of the received noise signal after interception, $F_I(f)$ is the function of FFT of the transmitted current noise signal after interception, $S_I(f)$ is the function of the transmitted current noise signal changing with the frequency accordingly, M(f) is the function of the sensitivity of the receiving hydrophone changing with the frequency, H(f) is the transfer function of the system, and $r_0$ is the distance between the transmitting transducer and the receiving hydrophone.

(9) Under the ideal free field condition, the signal received by the hydrophone is not affected by the reflection of the water tank boundary, and the frequency response of the transfer function is usually equal to 1. However, the frequency response of the transfer function is usually not equal to 1, which is a function that changes with the frequency and reflected wave. FIG. 1 shows the normalized curve of the sound wave only under the direct sound action and under the joint action of the direct sound and the reflected wave. It can be seen from the curve that under the direct sound action, the normalized curve of the amplitude of the sound wave is a straight line that does not change with time, but when the reflected wave is superimposed, it becomes a curve that changes periodically. By analyzing the sound wave in the sound field, the sound wave transmitted by the transducer can be expressed as:

$$p(f, t) = \frac{p_0}{r} e^{j(2\pi f t - kr)} \tag{7}$$

Wherein, p(f, t) is a function of time and frequency of sound pressure of the sound wave, $p_0$ is the sound pressure at 1 m away from the transmitting transducer underwater, and r is the distance between the underwater and the acoustic center of the transmitting transducer.

The direct and reflected sound can be expressed as:

$$p_r(f, r_i) = \frac{p_0}{r_i} e^{-jkr_1} \tag{8}$$

$$p_0(f, r_0) = \frac{p_0}{r_0} e^{-jkr_0}$$

Wherein, $p_0$ is the sound pressure of the direct wave and $r_0$ is the acoustic path of the direct wave, $o_r$ is the sound pressure of the ith reflected wave and $r_i$ is the acoustic path of the ith reflected wave.

Considering that the hydrophone receives signals from direct sound and reflected sound in a finite space, the transfer function can be expressed as:

$$H(f) = \frac{p_0(f, r_0) + \sum p_r(f, r_i)}{p_0(f, r_0)} 1 + \sum \frac{r_0}{r_i} e^{-j2\pi f(r_0 - r_i)/c} \tag{9}$$

Wherein: c is the velocity of sound wave under water.

For the transfer impedance frequency response function Z(f) in the limited water area, because of the reverberation effect, the reflected wave will cause the transfer impedance to fluctuate periodically around the free field transfer impedance after the reflected wave is superimposed. In this case, if the rectangular window is used for CMWA processing, the transfer impedance after eliminating the reflected wave can be obtained, as shown in equation (10):

$$Z'(f) = \frac{1}{r_0} \frac{1}{\Delta f_{wi}} \int_{f + \frac{\Delta f_{wi}}{2}}^{f + \frac{\Delta f_{wi}}{2}} S_I(f) M(f) H(f) \cdot e^{j2\pi \Delta t_{di} f'} df \tag{10}$$

Wherein, $\Delta f_{Wi}$ is the rectangular window corresponding to the ith reflected wave, and $\Delta t_{di}$ is the time delay between the reflected wave and the direct wave corresponding to the ith reflected wave.

Provided that $0.8 \leq (\Delta f_i \times \Delta t_i) \leq 1$. After the moving average, the influence of reflection wave with delay time of $\Delta t_{di}$ on the measurement of transfer impedance can be eliminated. After multiple times of moving average, the influence of other reflection waves on the measurement can also be eliminated, and finally the frequency response of transfer impedance under free field condition can be obtained.

Figure 2:
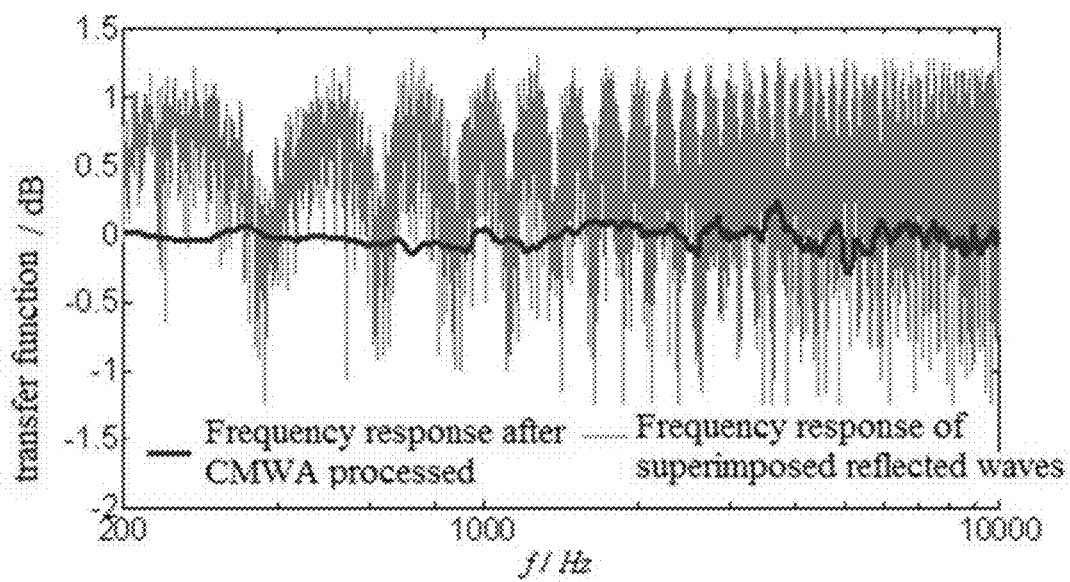
FIG. 2 is a transfer function frequency response curve diagram of the transfer function broadband signal corresponding to the pink noise signal after the complex moving weighted averaging (CMWA) method with a rectangular window.

FIG. 2 is a transfer function frequency response curve of the transfer function broadband signal corresponding to the pink noise signal after the CWMA method through a rectangular window. It can be seen from the curve that the transfer function is not like the transfer function under the free field condition under the interference of the boundary reflection of the limited water area, but after moving average processing, the transfer function of the system is stable near 1 (0 dB), and its fluctuation is not more than ±0.3 dB, which indicates that it can meet the measurement requirements well.

(10) After the transfer impedance of the transmitting transducer and the hydrophone under test is obtained, the obtained transfer impedance can be used to perform broadband measurement the sensitivity of the hydrophone under noise conditions by means of the free field comparison method.

Figure 3:
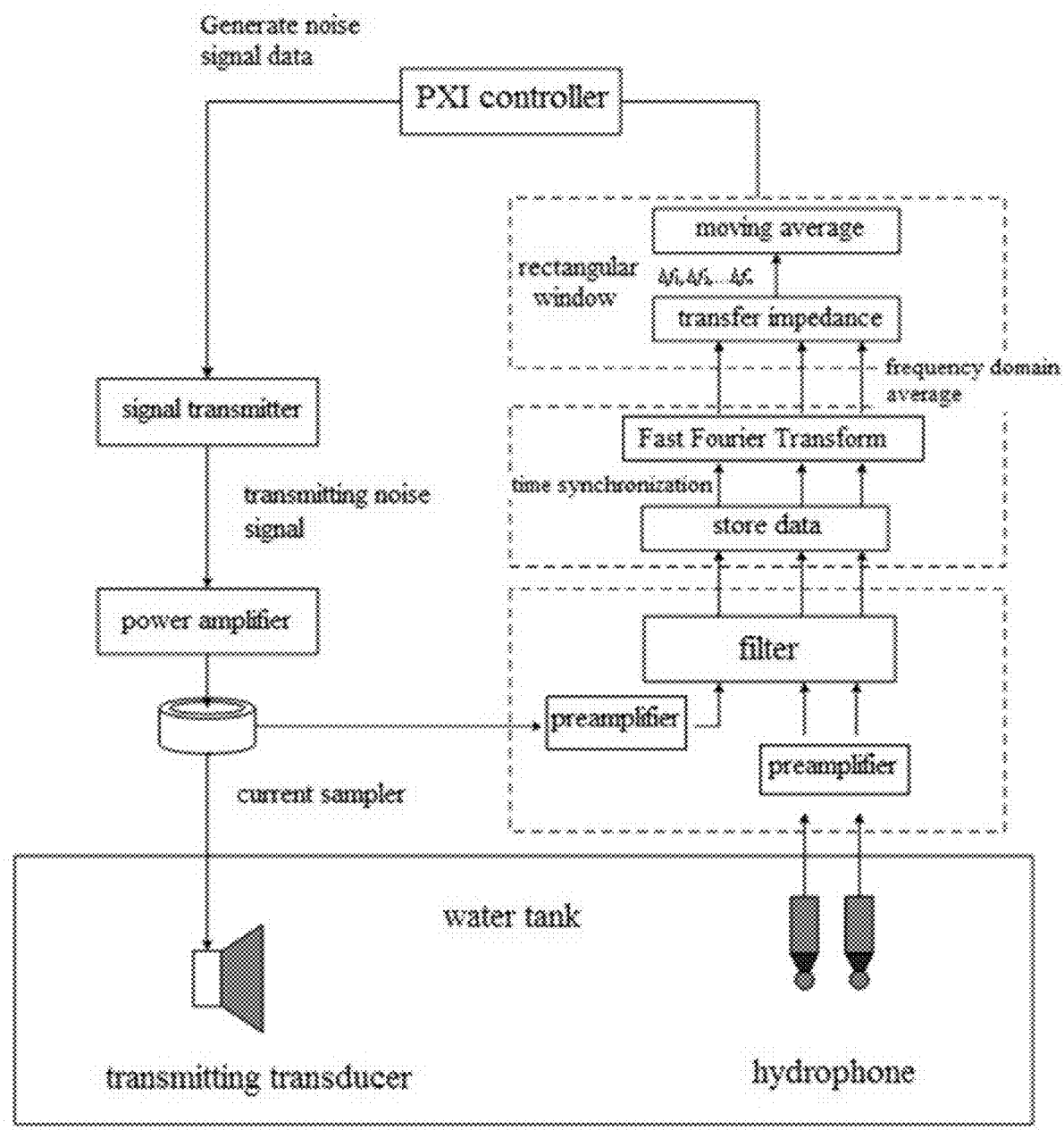
FIG. 3 is a schematic structural diagram of a pink noise-based hydrophone sensitivity free-field broadband calibration device according to the present disclosure.

The pink noise-based hydrophone sensitivity free-field broadband calibration device of the present disclosure is composed of the instrument shown in FIG. 3. The system includes PXI controller (upper computer system), signal source, linear power amplifier, standard hydrophone, hydrophone under test, preamplifier, digital filter, dual channel PXI collector and other devices.

The entire measurement is performed in a limited water area, the linear power amplifier is required to have a relatively flat linear response in the measurement frequency range, and the preamplifier has a good phase consistency in the whole frequency range.

In the whole calibration system, the PXI controller totally controls the signal transmission of the signal source and the data acquisition of the data acquisition system. The time delay to of transmitted current signal, the time delay $t_1$ of acquisition system and the time delay $t_2$ of acoustic path difference between transmitting transducer and hydrophone are measured by high-frequency pulse signal. The time delay of the reflected wave relative to the direct sound is $\Delta t_{di} \ldots \Delta t_{dn}$. But according to the actual situation, because the sound absorption effect of the anechoic tank is good, the reflection is not obvious, and the reverberation effect of the water tank is small, so the delay time of the reflection is taken as $\Delta t_1$, $\Delta t_2$, and other reflections can be ignored.

Due to the limited measurement frequency and bandwidth, the broadband pink noise is programmed in the computer. The noise signal is randomly generated by the computer into Gaussian white noise and the Gaussian random white noise generates the pink noise through the octave attenuation filter (1/f). The PXI controller controls the signal source to transmit the corresponding noise signal. The signal is linearly amplified by the power amplifier, and a sound signal needed for measurement is generated in limited water area by the transmitting transducer.

The received signal simultaneously collects the open circuit voltage signal of the hydrophone and the transmitted current signal after passing through the current sampler. In order to eliminate the influence of the uneven distribution of the noise signal in the frequency band on the system broadband frequency response, a total of 100 sets of broadband noise signals are collected. The open circuit voltage signal and the transmitted current signal are intercepted according to the time delay of the noise signal to ensure that the transmitted current noise signal and the received voltage noise signal have a one-to-one correspondence. FFT is performed on the two groups of intercepted signals to obtain the response spectrum, and 100 groups of signals are performed coherently average in the frequency domain. The corresponding moving average rectangular windows $\Delta f_{W1} \ldots \Delta f_{Wn}$ are obtained by calculation according to $\Delta t_{di} \ldots \Delta t_{dn}$, and the rectangular windows are used to perform the CMWA processing on the averaged signal in the frequency domain to eliminate the influence of water tank reverberation on broadband measurement, so as to obtain the broadband frequency response of the transfer impedance under free field conditions.

Using the same method, the transfer impedance frequency response $Z_x(f)$ and $Z_0(f)$ of the standard hydrophone and the hydrophone under test are obtained respectively. Finally, the sensitivity of the free field of the hydrophone under test is obtained by equation (11), and the broadband measurement of the sensitivity is completed.

$$M_x(f) = 20 \lg \frac{Z_x(f)d_x}{Z_0(f)d_0} + M_0(f) \quad (11)$$

The whole device not only can be used for the measurement of the calibration of hydrophones, but also can be used for underwater acoustic parameters measurement of other transducers. At the same time, the method and device are not limited to be applied to anechoic tanks, but can also be applied to the measurements of broadband performance of the transducers in reverberation tanks, field tests, etc., which has a wide range of applications.

The above description of the embodiments is to facilitate those of ordinary skill in the art to understand and apply the present disclosure. It is obvious that those skilled in the art can easily make various modifications to the above-mentioned embodiments, and apply the general principles described here to other embodiments without creative efforts. Therefore, the present disclosure is not limited to the above-mentioned embodiments. According to the disclosure of the present disclosure, the improvements and modifications made to the present disclosure by those skilled in the art are within the scope of the present disclosure.

What is claimed is:

1. A method of free-field broadband calibration of hydrophone sensitivity based on pink noise comprising the following steps:
  (1) generating a pink noise signal with a certain bandwidth according to a measurement frequency range, and performing a power amplification to the pink noise signal;
  (2) exciting, by the pink noise signal after power amplification, a transmitting transducer to generate a sound signal underwater, receiving the sound signal by two hydrophones, wherein one of the two hydrophones is a standard hydrophone, whose sensitivity $M_0$ is known, and the other one is the hydrophone under test, the sensitivity $M_x$ of the hydrophone under test is to be measured; converting the received sound signal into a corresponding voltage signal by the two hydrophones, respectively, performing impedance matching and pre-amplification on the corresponding voltage signal by a preamplifier, then performing anti-aliasing filtering on the corresponding voltage signal after amplification by a filter to obtain the open circuit voltage signal $U_0$ corresponding to the standard hydrophone and the open circuit voltage signal $U_x$ corresponding to the hydrophone under test;
  (3) at the same time, performing current sampling on the pink noise signal after power amplification to generate a corresponding voltage signal $U_1$ at a ratio of 1:1, inputting the voltage signal $U_1$ to the preamplifier to conduct impedance matching and pre-amplification, and performing anti-aliasing filtering by a filter;

(4) storing the voltage signals $U_0$ and $U_x$ and the voltage signal $U_I$ obtained after current sampling in a computer;

(5) after repeating n times according to steps (1) to (4), obtaining n groups of open circuit voltage signals $U_{01}$, $U_{02}$, ..., $U_{0n}$ of the standard hydrophone, n groups of open circuit voltage signals $U_{x1}$, $U_{x2}$, ..., $U_{xn}$ of the hydrophone to be tested and n groups of voltage signals $U_{I1}$, $U_{I2}$, ..., $U_{In}$ after current-sampled; performing time delay processing to these signals respectively in the computer to obtain following voltage signals accordingly: ($U'_{01}$, $U'_{02}$, ..., $U'_{0n}$, $U'_{x1}$, $U'_{x2}$, ..., $U'_{xn}$ and $U'_{I1}$, $U'_{I2}$, ..., $U'_{In}$; and then performing FFT (Fast Fourier Transform) calculation on these obtained signals to obtain the corresponding complex spectrum $F_{01}$, $F_{02}$, ..., $F_{0n}$, $F_{x1}$, $F_{x2}$, ..., $F_{xn}$ and $F_{I1}$, $F_{I2}$, ..., $F_{In}$; wherein n is a natural number and is greater than 1;

(6) averagely calculating the above complex spectrum in a frequency domain according to equation (1) to obtain the signals $F_0$, $F_x$ and $F_I$ after averaging the corresponding complex spectrum; thereby obtaining a complex response function of the transfer impedance between the standard hydrophone and the transmitting transducer and the hydrophone under test with respect to the frequency f through the voltage signals, wherein the complex response function comprises random noise and reflected sound, as shown in equation (2):

$$F_0 = \frac{F_{01} + F_{02} + ... + F_{0n}}{n} \quad (1)$$
$$F_x = \frac{F_{x1} + F_{x2} + ... + F_{xn}}{n}$$
$$F_I = \frac{F_{I1} + F_{I2} + ... + F_{In}}{n}$$

$$Z_x(f) = F_x / F_I \quad (2)$$
$$Z_0(f) = F_0 / F_I$$

wherein $Z_x(f)$ is the complex response function of the transfer impedance between the transmitting transducer and the hydrophone under test with respect to the frequency f, $Z_0(f)$ is the complex response function of the transfer impedance between the transmitting transducer and the standard hydrophone with respect to frequency f;

(7) performing complex moving average processing on the complex response function using a rectangular window in the frequency domain to obtain the complex transfer impedance between the transmitting transducer and the hydrophone under free-field conditions;

(8) under the premise that the sensitivity of the standard hydrophone is known, calculating the broadband sensitivity of the hydrophone under test according to the transfer impedance of the two hydrophones and the transmitting transducer under free-field conditions, as shown in equation (3):

$$M_x(f) = 20 \lg \frac{Z_x(f) d_x}{Z_0(f) d_0} + M_0(f) \quad (3)$$

wherein $M_x(f)$ is the broadband sensitivity of the hydrophone under test at frequency f, $M_0(f)$ is the broadband sensitivity of the standard hydrophone at frequency f, and $d_x$ is the distance between the transmitting transducer and the hydrophone under test, $d_0$ is the distance between the transmitting transducer and the standard hydrophone.

2. The method of free-field broadband calibration of hydrophone sensitivity based on pink noise according to claim 1, wherein the specific implementation process of the step (1) is: firstly, generating pink noise data by a PXI controller or a computer; then generating the pink noise signal according to the pink noise data from the noise signal source; finally, performing the power amplification to the pink noise signal by a power amplifier, and exciting the transmitting transducer to generate an sound signal underwater.

3. The method of free-field broadband calibration of hydrophone sensitivity based on pink noise according to claim 1, wherein a width of the rectangular window in step (7) depends on a spatial size of the free-field in the limited water area and time delay of the reflected wave and the direct wave, the time delay $t_d$ of the reflected wave and the direct wave is measured by transmitting a high-frequency pulse signal, and then the width $\Delta f_W$ of the moving average rectangular window is obtained, which meets the following conditions:

$$(0.8/t_d) * \Delta f \leq \Delta f_W \leq (1/t_d) * \Delta f \quad (4)$$

wherein $\Delta f$ is the frequency resolution of the corresponding voltage signal after FFT, $\Delta f = f_s/N$, $f_s$ is the sampling rate, N is the number of sampling points of the noise signal, and $t_d$ is the time delay of the reflected wave and direct wave.

4. The method of free-field broadband calibration of hydrophone sensitivity based on pink noise according to claim 1, wherein the power of the pink noise signal is continuously attenuated from low frequency to high-frequency with frequency f, that is, the power spectral density of the signal satisfies the 1/f relationship; the pink noise signal is a broadband signal, and the bandwidth of the pink noise signal is greater than the measurement frequency bandwidth, and the upper limit and lower limit of the bandwidths meet the following relationship:

$$f_l \leq f_{l0} - \frac{\Delta f_W}{2} \quad (5)$$
$$f_h \leq f_{h0} + \frac{\Delta f_W}{2}$$

wherein $f_l$ is the lower limit frequency of the pink noise signal, $f_{l0}$ is the lowest frequency of the measurement frequency band, $f_h$ is the upper limit frequency of the pink noise signal, $f_{h0}$ is the maximum frequency of the measurement frequency band, and $\Delta f_W$ is the width of the moving average rectangular window in the frequency domain.

5. The method of free-field broadband calibration of hydrophone sensitivity based on pink noise according to claim 1, wherein the time delay processing in the step (5) is: firstly, measuring the time delay, trigger delay of the sound signal sent by the transmitting transducer and the time delay caused by the difference in acoustic path between the transmitting transducer and the hydrophone under test by the high-frequency pulse signal; performing interception and zero padding on the sound signal by the corresponding number of sampling points to ensure that the transmitted signal and the received signal have the same signal length and corresponds to each other in time.

6. The method of free-field broadband calibration of hydrophone sensitivity based on pink noise according to claim 1, wherein the entire measurement process is carried out in waters, not limited to an anechoic tank, a reverberation tank and lakes, seas and other water areas, the shape of the water area is not limited to rectangular, tank.

7. The method of free-field broadband calibration of hydrophone sensitivity based on pink noise according to claim 1, wherein when the rectangular window is used for complex moving weighted averaging, a moving average rectangular window needs to be selected according to the boundary reflection of the measured water area to restrain the fluctuation effect of the reflected wave on the transfer function, and the processing times depends on the reverberation of the water area; when the boundary reflection is strong, the processing times are many; when the boundary reflection is week, the processing times are less; the size of the moving average window depends on the delay time of the reflected wave.

* * * * *